| United States Patent [19] | [11] 3,984,629 |
| --- | --- |
| Gorog | [45] Oct. 5, 1976 |

[54] FLYING SPOT SCANNER UNAFFECTED BY AMBIENT LIGHT

[75] Inventor: Istvan Gorog, Princeton, N.J.

[73] Assignee: RCA Corporation, New York, N.Y.

[22] Filed: Dec. 23, 1974

[21] Appl. No.: 535,809

[52] U.S. Cl. .................................. 178/7.1; 178/7.2; 178/7.6; 178/7.7; 178/DIG. 12; 178/DIG. 27; 178/DIG. 29
[51] Int. Cl.² .......................................... H04N 3/14
[58] Field of Search............... 178/7.1, 7.6, DIG. 27, 178/DIG. 29, 7.7, 7.2, DIG. 12

[56] References Cited
UNITED STATES PATENTS

| 2,476,698 | 7/1949 | Clapp | 178/7.7 |
| 2,982,816 | 5/1961 | Griengl | 178/7.2 |
| 3,003,026 | 10/1961 | Astheimer | 178/7.1 |
| 3,230,292 | 1/1966 | Routh | 178/7.2 |
| 3,830,972 | 8/1974 | Siverling | 178/7.1 |

Primary Examiner—Robert L. Griffin
Assistant Examiner—Edward L. Coles
Attorney, Agent, or Firm—Carl V. Olson; Edward J. Norton

[57] ABSTRACT

A flying spot scanner is disclosed for scanning an object document or scene with a spot of light, and producing an electrical video signal representing the object. The scanner can be operated under normal ambient light conditions without a light-shielding enclosure. A light beam is deflected in repetitive scanning fashion over the object. The light beam is modulated in amplitude (intensity) at a radio frequency $f_c$ such as 1.2 MHz. A photodetector is positioned to receive light from the object, and it produces an unwanted electrical ambient light noise signal having a maximum frequency $f_a$, and an electrical information signal consisting of a carrier at frequency $f_c$ modulated by a video signal having a maximum frequency $f_m$, where $f_c - f_m$ is larger than $f_a$. The information signal is separated from the ambient light noise signal by a filter, and the information signal is demodulated to produce a facsimile or video information signal free of noise due to ambient light.

7 Claims, 4 Drawing Figures

FLYING SPOT SCANNER UNAFFECTED BY AMBIENT LIGHT

BACKGROUND OF THE INVENTION

A flying spot scanner is a means for scanning an object document or scene with a spot of light, and producing a time-varying electrical signal representing the scanned object. The scanning spot of light may be provided by a raster-scanned cathode ray tube and a stationary optical imaging system. Or, the scanning spot of light may be provided by a focused beam of laser light which is deflected by rotating mirrors, or by acousto-optical or electro-optical deflectors. A photodetector is positioned to receive a portion of the light reflected or scattered from, or transmitted by, the moving illuminated spot on the object. When the source of the scanning light beam is spaced from the object, the photodetector must also be spaced from the object and have a light acceptance angle at least large enough to encompass the entire object. As a result, ambient light can reach the photodetector directly or by reflection from the object. It is not practical to exclude ambient light from the photodetector by the use of an interference light filter which passes only the highly monochromatic light from a laser because light filters cannot be made with the necessary narrow pass band and wide range of light acceptance angles. Ambient light will reach the photodetector unless the entire system is shielded by a light-tight enclosure. An enclosure is an operating inconvenience in the case of a facsimile system for scanning documents, and is often not practical in the case of a system for scanning a large three-dimensional scene.

The ambient light normally has a large steady or d.c. component, and also has a varying or a.c. component caused by incandescent and fluorescent lamps. This varying ambient light having frequency components up to about a few hundred Hertz, or higher in the case of fluorescent light, is very disturbing to an exposed flying spot scanning system. The ambient light produces electrical signals from the photodetector which swamp out the graphic information signals of the same frequency and prevent a faithful reproduction of the object by a display device.

SUMMARY OF THE INVENTION

A flying spot scanner is made to be substantially unaffected by ambient light by modulating the scanning light at a high constant frequency $f_c$. The electrical signal produced by the photodetector is a carrier at frequency $f_c$ modulated by the graphic information. This information-modulated carrier is coupled to a detector through a filter which discriminates against the much-lower-frequency ambient noise signal. The output of the detector is passed through a low-pass filter to produce a noise-free graphic information signal.

THE DRAWING

BRIEF DESCRIPTION OF THE PREFERRED EMBODIMENT

Figure 1:
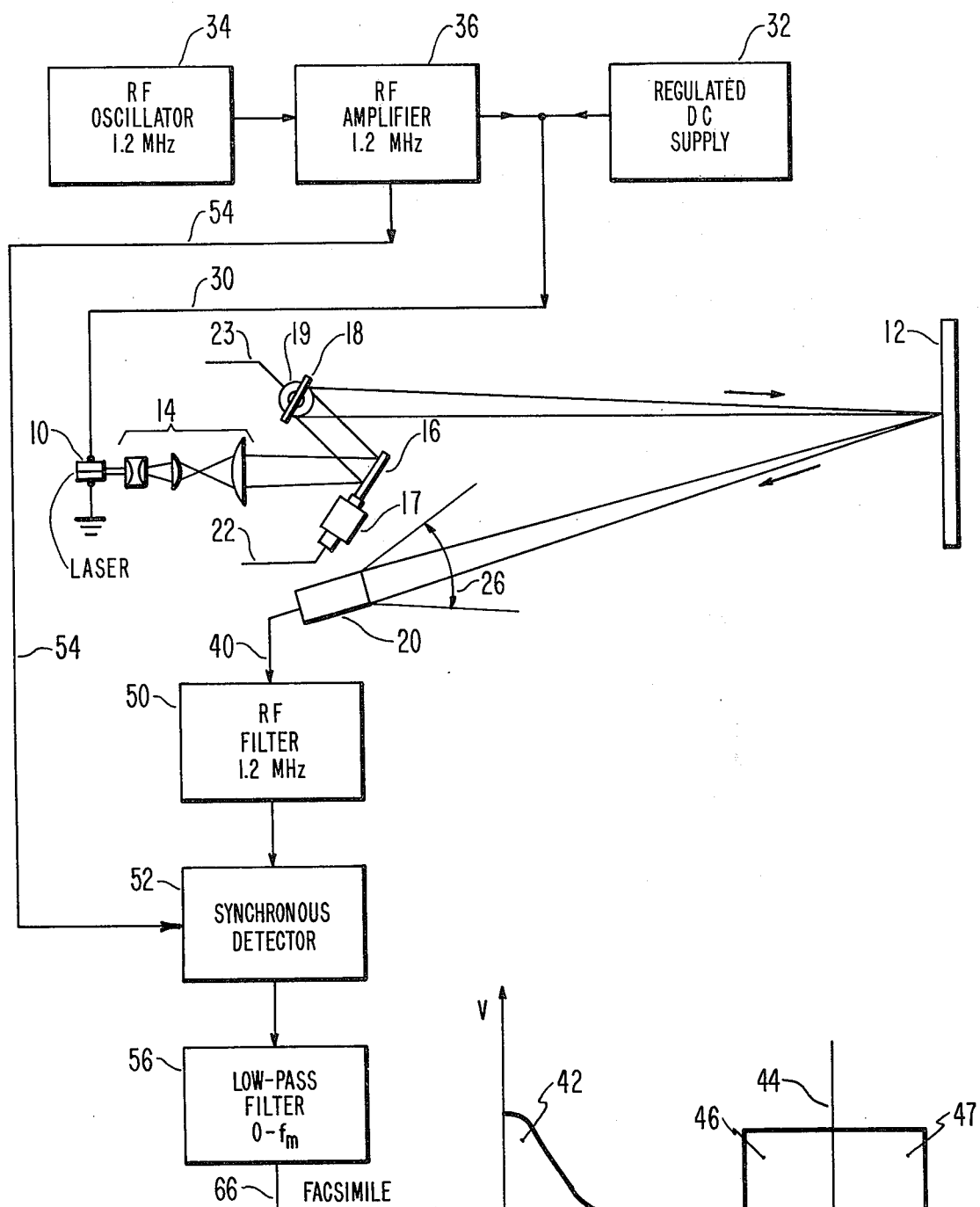
FIG. 1 is a diagram of the optical, electromechanical and electronic elements of a flying spot scanner system constructed according to the teachings of the invention.

The flying spot scanner system shown in FIG. 1 includes an injection laser 10 which may be a continuous-wave room-temperature (AlGa)As-(AlGa)As double-heterojunction injection laser having an output light wavelength of 8100 Angstroms, an output power of about 10 miliwatts and requiring a drive power of about 700 miliamperes at 2 volts (1.4 watts). The light emitted from the laser 10 is a slit-shaped beam which may be translated into a circular spot on an object document 12 by means of astigmatic beam-forming optics 14 consisting of a ten power microscope objection (NA=0.25) followed by two parallel cylindrical lenses having approximate focal lengths of 18 mm and 100 mm. In the actually-constructed system being specifically described solely by way of example, the distance from the optics 14 to the object 12 was 74 cm. and the beam power reading the object 12 was 3 miliwatts.

The laser beam from the optics 14 is first deflected in a horizontal direction by a mirror 16 oscillated by a galonometer motor 17, and is then deflected in a vertical direction by a mirror 18 oscillated by a galvanometer motor 19. The galvanometer motor 17 is supplied over line 22 with a linear ramp current having a repetition period of 14 miliseconds, and motor 19 is supplied over line 23 with a linear ramp current having a repetition period of 14 seconds. The ramp currents applied to the galvanometer motors cause a deflection of the laser beam such that it scans a rectangular area (20 cm by 25 cm) on the object 12 in the usual raster scanning fashion. Any other type of scanning of the object 12 may be employed if desired.

The object 12 may consist of a document containing printed information. As the document is scanned by the spot of light, light is reflected in all directions from the illuminated spot on the document, and some of the light is reflected back to a photodetector 20. The photodetector 20 may be a conventional RCA Type 7102 photomultiplier (with S-1 response), or may be an array of four silicon PIN photodiodes. The light reflected to the photodetector 20 at any particular instant of time depends on the reflectance of the spot on the document that is illuminated at that instant. The photodetector 20 receives light from all angles within a cone or pyramid, represented at 26, which is sufficiently broad to encompass at least all of the area of the object document 12. The photodetector inevitably receives disturbing ambient light, unless the entire system is enclosed in a light tight box. This is true even though attempts are made with a filter on the photodetector to reject light of all wavelengths other than the one generated by the laser 10. The disturbing effects of ambient light are avoided, according to the invention, by modulating the intensity of the light beam from the laser 10, and by filtering the electrical signal output of the photodetector 20.

The light beam emitted from injection laser 10 has a given average intensity when a certain drive current is applied to it over line 30 from a regulated direct-current supply 32. The laser light beam can be made to vary, at a radio frequency rate such as 1.2 MHz, between a minimum or zero amount of light and a maximum amount of light by varying the drive current supplied to the laser. This may be done by applying the output of a radio-frequency oscillator 34 through a radio-frequency amplifier 36 to the laser drive line 30, which also receive a constant drive current from supply 32. Circuits 32, 34, and 36 are shown in greater detail in FIG. 3 and will be described in connection therewith.

Figure 2:
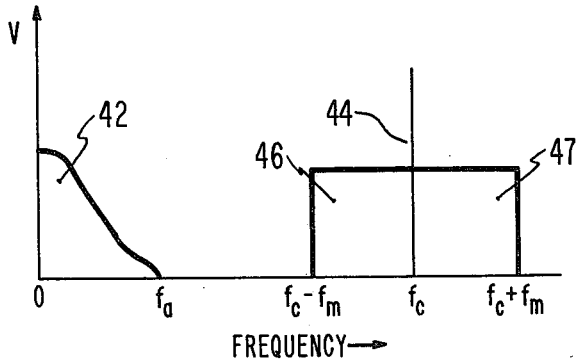
FIG. 2 is a chart of electrical signal frequency components which will be referred to in describing the operation of the system of FIG. 1.

The electrical signal on line 40 from the photodetector 20 has frequency components as shown in FIG. 2. The components 42 between zero frequency and frequency $f_a$ result from the conversion, by the photodetector, of ambient light variations into disturbing noise signals. The ambient light noise frequencies generally extend from zero to a few hundred Hertz. The signal 44 at frequency $f_c$ (1,200,000 Hz) is a carrier frequency due to the radio frequency modulation of the laser light beam. The signals within the envelopes 46 and 47 represent the lower and upper sidebands of graphic information modulation, having a maximum frequency $f_m$, on the carrier $f_c$. In the example being described, the information frequency components extended from zero to 33,333 Hertz. This value resulted from the scanning of graphic information with a resolution of 20 cycles per centimeter (100 lines per inch), and the scanning parameters, according to the formula: $f_m$(20 cycles/cm) × (20 cm line lengths)/(12 × 10$^{-3}$ sec active line time)= 33,333 Hz.

The electrical signal at the output 40 of photodetector 20 is applied to a radio-frequency filter 50 having a pass band sufficiently wide to pass the carrier 44 at frequency $f_c$ and the sidebands at frequencies between $f_c-f_m$ and $f_c+f_m$. The filter 50 rejects ambient light noise frequency components 42 extending from zero to $f_a$ in frequency.

The frequency components passed by filter 50 are applied to a synchronous detector 52 which also receives a demodulating reference oscillation over line 54 from the oscillation amplifier 36. The output from detector 52 is passed through a low-pass filter 56 to provide a substantially ambient-noise-free facsimile output signal having graphic information signal components frequencies from zero to $f_m$. Circuits 50, 52 and 56 are shown in greater detail in FIG. 4 and will be described in connection therewith.

Figure 3:
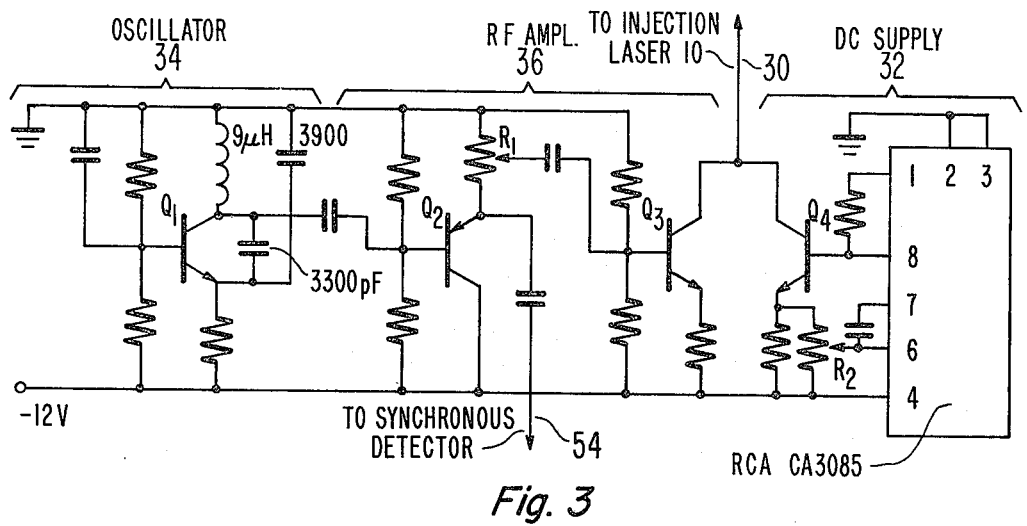
FIG. 3 is a circuit diagram of the means in FIG. 1 for energizing the injection laser to produce a modulated light beam.

FIG. 3 shows the RF oscillator 34 to consist of a conventional Colpitts oscillator including a transistor $Q_1$ and frequency determining elements having labelled values of inductance and capacitance. The radio frequency amplifier 36 is conventional in including a buffer amplifier transistor $Q_2$ and a current driver transistor $Q_3$. The resistor $R_1$ adjusts the output current for the laser diode to about 30 miliamperes peak-to-peak. The regulated direct current supply includes an RCA Type CA3085 integrated circuit in combination with a current driver transistor $Q_4$. The resistor $R_2$ adjusts the d.c. bias current to the laser diode to a value in the range of from 200 to 800 miliamperes.

Figure 4:
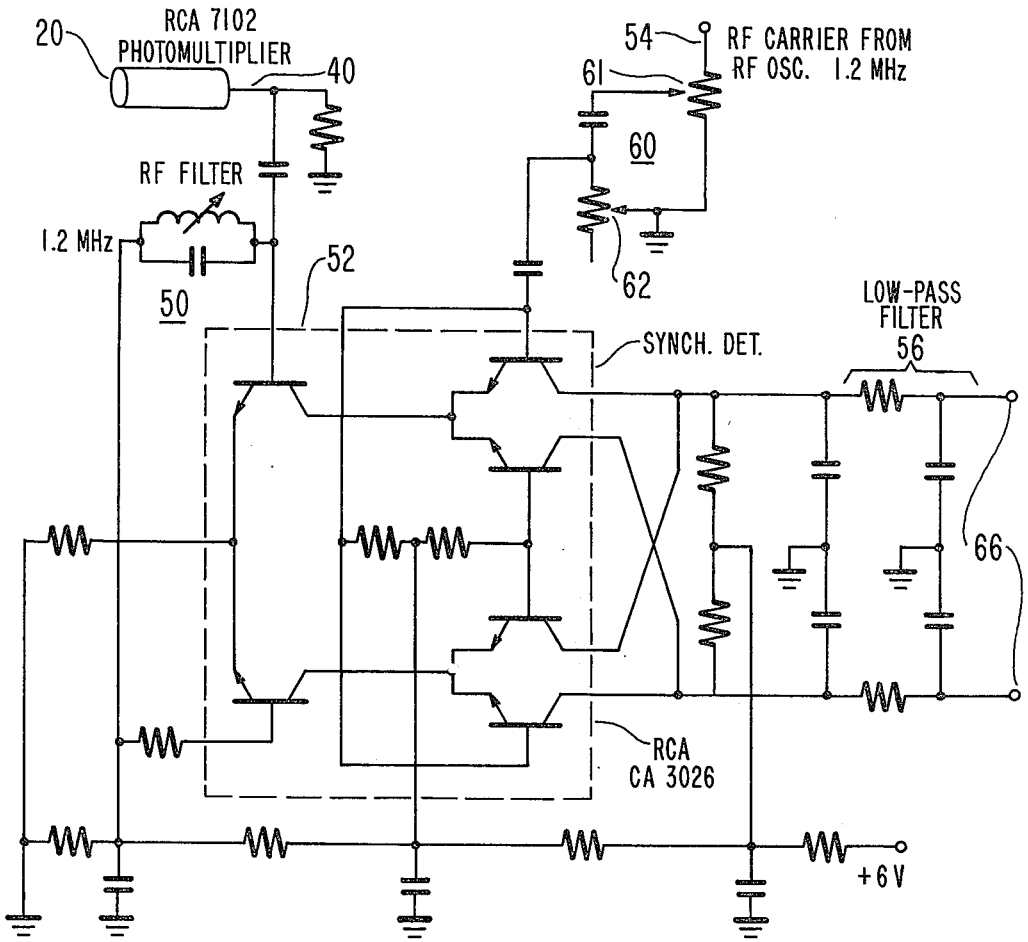
FIG. 4 is a circuit diagram of the means in FIG. 1 for filtering and demodulating the electrical signal derived from the photodetector.

FIG. 4 shows the photomultiplier 20 and the coupling therefrom through a 1.2 MHz filter 50 to the signal input of a doubly-balanced synchronous detector 52, which is an RCA Type CA 3026 integrated circuit unit. The reference frequency signal input to the synchronous detector is applied from amplifier 36 through lead 54 and coupling circuit 60. Potentiometer 61 provides an amplitude adjustment, and potentiometer 62 provides a phase adjustment. The illustrated linkage over lead 54 of the 1.2 MHz oscillations from 34 and 36 to the synchronous detector insure optimum demodulation of the information-modulated carrier signal despite possible drifting of the frequency of oscillator 34. Other types of demodulators may, of course, be employed. The output of the synchronous detector is coupled through a low-pass filter 56 to a facsimile or video signal output terminals 66. The output signal includes components having frequencies between zero and $f_m$, where $f_m$ is the maximum frequency derived by scanning the graphic information of the object document, and in the present example is 33,333 Hertz.

OPERATION

To summarize the operation of the system of FIG. 1, the 1.2 MHz oscillator 34, the amplifier 36 and the regulated d.c. supply 32 cooperate to supply a 1.2 MHZ drive or power supply current over line 30 to the injection laser 10. The light beam emitted by the laser is thus modulated in intensity at the 1.2 MHz rate. The light beam is shaped by the optics 14 and is deflected by horizontal scan mirror 16 and then by vertical scan mirror 18 so that it raster scans the object 12. Light reflected from the flying spot on the object 12 varies in intensity at the 1.2 MHz rate and is modulated by the graphic subject matter of the object at a rate up to 33 kHz. Some of this reflected light is received by the photosensor 20 which produces a corresponding electrical signal on its output lead 40.

The photodetector 20 also receives ambient light fluctuating at frequencies up to a few hundred Hz, and the photosensor produces a corresponding electrical signal on its output lead 40. The ambient light noise signal may have an amplitude which is 100 times the amplitude of the desired graphic information signal. However, the noise signal 42 (in FIG. 2) is at a frequency well spaced from the frequency of the graphic information carrier 44 and modulation sidebands 46, 47. The filter 50 passes the information carrier and sidebands to the detector 52, and attenuates the noise signal. The detector 52 demodulates the modulated carrier and produces a graphic information signal having frequencies from zero up to $f_m$=33 kHz. If the detector 52 is a synchronous detector as shown, the detector has the characteristic of translating any noise signals passed by filter 50 to frequencies between $f_c-f_a$ and $f_c+f_a$. These frequencies are too high to be passed by the low-pass filter 56. The desired graphic information signal at frequencies from zero to 33 kHz is passed by lowpass filter 56 to the facsimile signal output terminal 66.

The facsimile or video output signal at terminal 66 may be applied to any of a number of utilization devices (not shown). For example, the signal in a facsimile system for printed documents may be applied to a threshold circuit to translate it to an "on-off" or two-value signal, which is then applied to a cathode ray tube storage display such as the Tektronix Two-level Storage Display Unit. Or, the output signal may be applied as a two-level signal or as a continuous tone scale signal to a facsimile printer such as one using a laser modulated by the signal. It will be understood that the utilization device may be at a location remote from the scanner, and some or all of circuits 50, 52, and 56 also may be at the remote locations and coupled by a transmission link with the photodetector 20 and reference signal line 54.

What is claimed is:

1. A flying spot scanner for scanning an object document or scene with a spot of light and producing an electrical viedo signal representing the object, comprising a light beam source, means to deflect the light beam in scanning fashion over the object, means to modulate the amplitude of the light beam at a frequency $f_c$, a photodetector positioned to receive light from the object and produce an unwanted electrical ambient light noise signal having a maximum frequency $f_a$, and an electrical information signal consisting of a carrier at frequency $f_c$ modulated by a viedo signal having a maximum frequency $f_m$, where $f_c-f_m$ is larger than $f_a$, a filter coupled to the output of said photodetector for rejecting said noise signals to frequency $f_a$, and a detector having an input coupled to the output of said filter for demodulating a carrier at frequency $f_c$ and producing an output video information signal having frequencies to $f_m$.

2. A scanner as defined in claim 1 wherein said detector is a synchronous detector.

3. A scanner as defined in claim 1, and, in addition, a low-pass filter following said detector and providing an output free of ambient light noise.

4. A scanner as defined in claim 1 wherein said filter is a band pass filter which passes the carrier $f_c$ and its sidebands, and attenuates the noise at frequencies to $f_a$.

5. A scanner as defined in claim 1 wherein said light beam source includes a laser.

6. A scanner as defined in claim 5 wherein said laser is a semiconductor injection laser supplied with a drive current.

7. A scanner as defined in claim 6 wherein said means to modulate the amplitude of the light beam consists of means to modulate said drive current.

* * * * *